Jan. 13, 1970     E. R. BROADWELL     3,489,245
APPARATUS FOR FLUSHING INTERNAL COMBUSTION ENGINES
Filed Nov. 20, 1967     3 Sheets-Sheet 1

INVENTOR.
EDWIN R. BROADWELL
BY
ATTORNEYS.

INVENTOR.
EDWIN R. BROADWELL
BY
Christie, Parker & Hale
ATTORNEYS

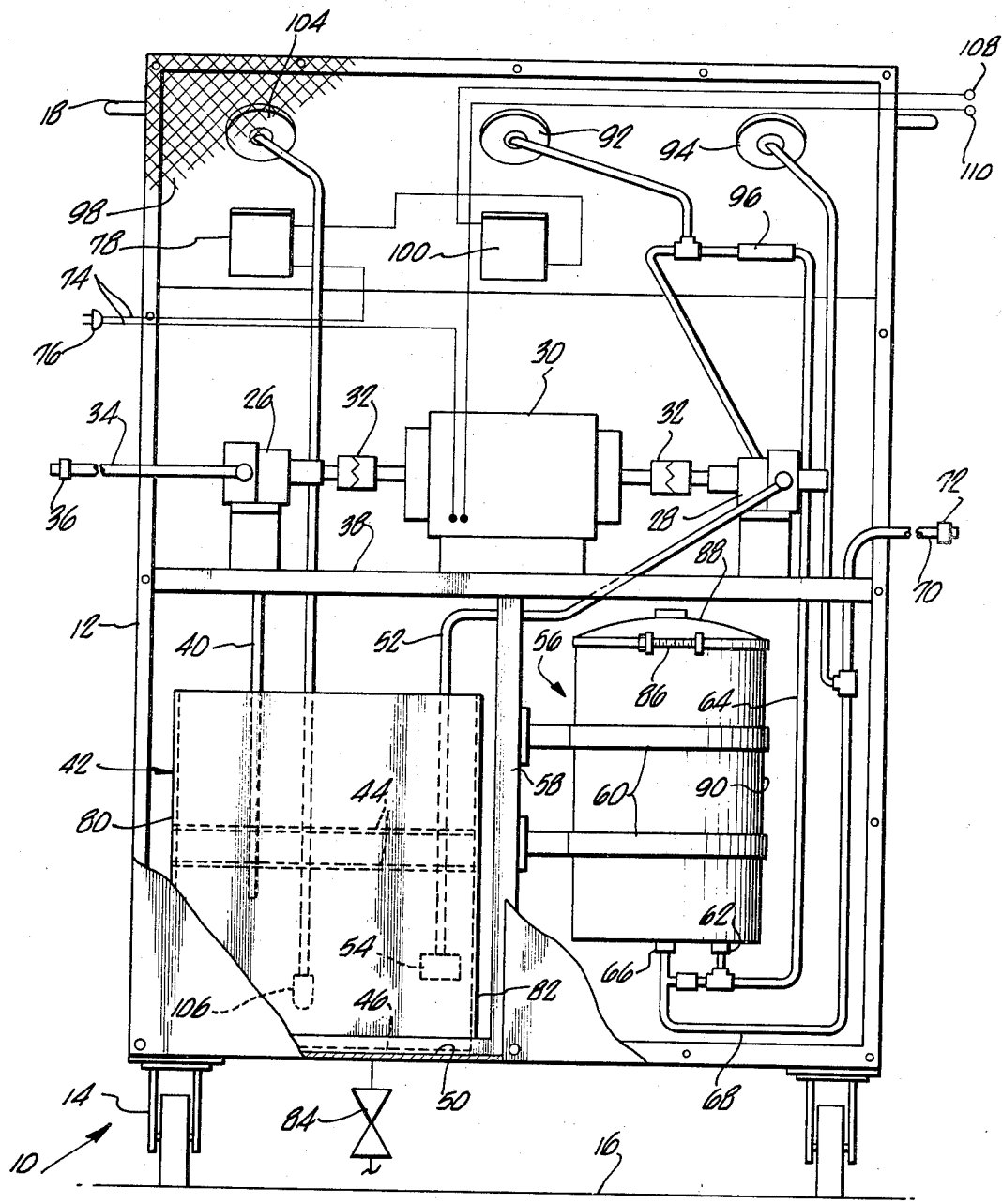

United States Patent Office 3,489,245
Patented Jan. 13, 1970

3,489,245
APPARATUS FOR FLUSHING INTERNAL COMBUSTION ENGINES
Edwin R. Broadwell, Hacienda Heights, Calif., assignor of fifteen percent to John E. Wagner, Pasadena, Calif.
Filed Nov. 20, 1967, Ser. No. 684,266
Int. Cl. F16n 33/00
U.S. Cl. 184—1.5                                15 Claims

ABSTRACT OF THE DISCLOSURE

An internal combustion engine flushing apparatus which includes a pump having a suction side adapted to be connected to a drainage hole of an oil pan of the engine and a pressure side in fluid connection with a separation tank. The separation tank includes baffle plates intermediate a conduit connecting the tank with the pump and a conduit which connects the separation tank with an intake of a filter. An outlet of the filter is adapted to be connected with a pressure fitting of a lubrication system of the combustion engine. Controls are provided to regulate the pressure of the fluid entering the filter at its intake. A drive motor is coupled with the pump and supplies the power to circulate flushing fluid through the apparatus and the combustion engine being flushed.

BACKGROUND OF THE INVENTION

Field of the invention

This invention relates to apparatus for flushing lubrication systems of internal combustion engines and more particularly to a flushing apparatus having a positive oil circulation system.

State of the prior art

Lubricants, and more specifically oils, employed in lubrication systems of internal combustion engines must be periodically replaced. The replacement is necessitated by contamination of the oil from foreign particles such as dirt and dust, metal shavings, tars and carbon deposits generated internally of the combustion engine, as well as by chemical decomposition of the oils, all of which are harmful to the proper operation and the prolongment of the engine's service life. Most particles are suspended in the oil and are removed from the engine during the oil change.

Although an oil change removes most of the undesirable contaminating particles there are particles which become lodged in corners and crevasses of oil conduits and lines, as well as in oil pumps, filters, and other components of the lubrication system. Moreover, since the lubrication system of an internal combustion engine is subjected to high temperatures during the operation of the engine some portions of the oil are scorched or otherwise decomposed and permanently adhere to walls of the conduits. They reduce their effective diameter and the effectiveness of the lubrication system.

In the past, it has been customary to flush lubrication systems of internal combustion engines periodically when oil is being changed. For example, a relatively thin oil is introduced into the system and the engine is run for a period of time, say ten to fifteen minutes. This removes part of the foreign and decomposed particles present in the lubrication system as well as portions of the old oil which are in the conduits and lines of the system. It has also become customary to add solvents and detergents to the flushing oils to dissolve ideally all, but at least portions, of scorched materials adhering to the conduit walls of the lubrication system. The effectiveness of the flushing operation, however, is limited because the flushing fluid becomes contaminated itself as it circulates through the system. Thus, the engine, and more particularly the lubrication system of it, can never be cleaned to a greater degree than the degree of contamination of the flushing fluid. Moreover, the flushing is relatively expensive since the fluid must be discarded after it has been used for flushing a single engine.

It has, therefore been suggested to use external flushing devices connected to an oil collecting pan of the internal combustion engine to circulate fluid externally of the engine and return it to the lubrication system at a suitable pressure fitting. To enhance the cleaning action of the flushing operation, the flushing apparatus has been provided with filter elements to remove foreign particles which are carried out of the engine by the fluid. The degree of cleanliness of the flushed engine has thereby been substantially enhanced.

The prior art devices, however, are not fully satisfactory since the relatively large number of contaminating particles which are disposed in the engine and removed by the flushing fluid quickly clog the filter elements of the apparatus. It is necessary to frequently replace or clean the elements. This is not only time consuming but also makes the apparatus costly to operate. The prior art devices, therefore, make it difficult to realize any cost savings over the previously practiced oil flushing of the engine. Prior art flushing devices moreover rely on gravity to circulate the flushing fluid or compound between the oil pan of the combustion engine and the device itself. Positive circulation of the flushing compound is therefore not assured, particularly when the flushing compound exhibits a relatively low viscosity, such as when the device is used in cold temperatures. Loss of the continuity of the fluid flow frequently requires priming of the pump before flushing compound can again circulate. Aside from this tedious and time consuming operation, there exists the great danger that loss of the fluid flow is not detected. If this loss is not detected, the engine runs wihout lubrication and can be heavily damaged. The resulting economic loss is extensive and often runs into hundreds of dollars even in relatively small automobile engines. The loss is correspondingly larger in commercially and industrially used internal combustion engines.

SUMMARY OF THE INVENTION

Briefly, an internal combustion engine flushing apparatus constructed in accordance with the present invention is provided with suction means including an intake adapted to be connected to a fluid collecting pan of the engine for removing flushing fluid disposed in the pan. The fluid is transferred by the suction means to a separation tank where foreign particles suspended in the fluid are separated from it. Filter means are in fluid connection with the separation tank and remove fine particles suspended in the fluid. An outlet is adapted to be connected with the lubrication system of the internal combustion engine and receives filtered fluid from the filter means.

A pump is disposed intermediate the separation tank and the filter means, for pumping the flushing fluid through the filter means and the lubrication system of the engine. The separation tank is provided with a baffle plate which is submerged in the fluid and aids in gravitationally separating foreign particles from the fluid.

This flushing apparatus insures positive circulation of the fluid through the lubrication system of the engine as well as between the oil pan of the engine and the suction means, which is preferably a conventional rotary pump, since suction pulls the flushing fluid from the pan to the pump. Interruption of the fluid flow with the resulting danger to the engine is thereby substantially eliminated. It is also possible to circulate the fluid more rapidly through the lubrication system, thereby enhancing the cleaning action of it, since the fluid can now be removed from the oil pan at the rate at which it is pumped into the lubrication system. Where no suction line is provided, even high viscosity fluids might be incapable of being removed from the pan rapidly enough to prevent rise of the fluid level. A high fluid level in the pan results in splashing and excessive foam formation which makes subsequent removal of the fluid from the pan difficult.

In the separation tank a large portion of the foreign particles which are carried out of the engine by the flushing fluid gravitationally separate therefrom. Irrespective of the quantity of foreign particles removed, frequent clogging of the system is thereby prevented. The gravitational separation is particularly effective for removing the larger particles. The filter means, which remove the finer contaminating particles still suspend in the fluid after it has gone through the separation tank can thereby be operated for substantially longer periods of time without having to be serviced. At the same time clean flushing fluid is always introduced into the lubrication system of the engine and, during a flushing cycle, substantially all foreign particles are removed from the system.

The flushing fluid can be re-used for flushing additional engines a practically unlimited number of times. Thus, the flushing apparatus of this invention not only permits the flushing of internal combustion engines at substantially lower costs than was heretofore possible, since the flushing fluid can be re-used over and over again and since the apparatus requires little maintenance, but it assures a substantially more complete and thorough cleaning of the lubrication system of the engine. The service free life of internal combustion engines regularly flushed with the apparatus of this invention is substantially enhanced, thereby reducing the costs of operating it.

BRIEF DESCRIPTION OF THE DRAWINGS

FIG. 3 is a rear elevational view, with parts broken away, of the flushing apparatus shown in FIG. 1.

DESCRIPTION OF THE PREFERRED EMBODIMENTS

Figure 1:
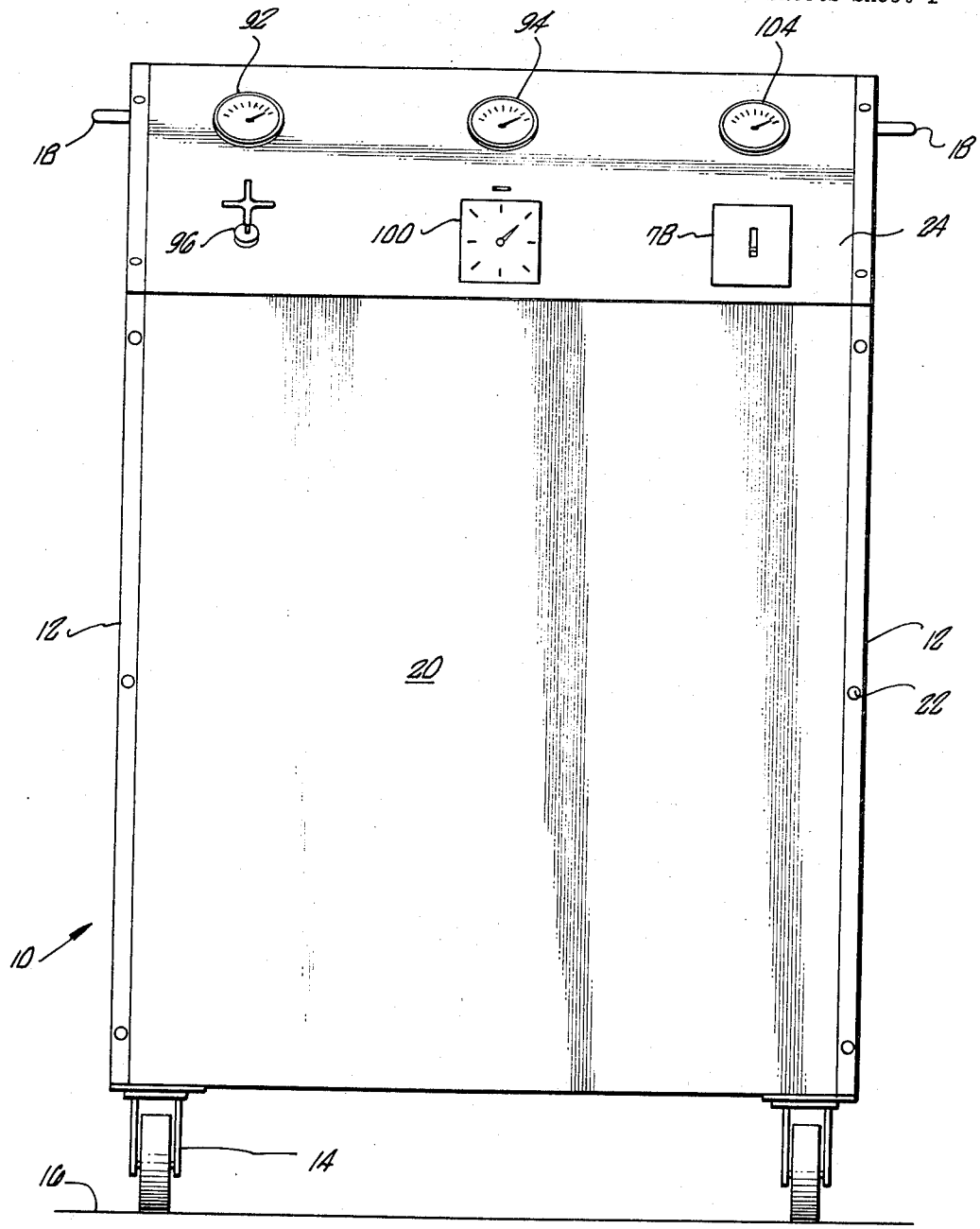
FIG. 1 is a front elevational view of a flushing apparatus constructed in accordance with the present invention.
Figure 2:
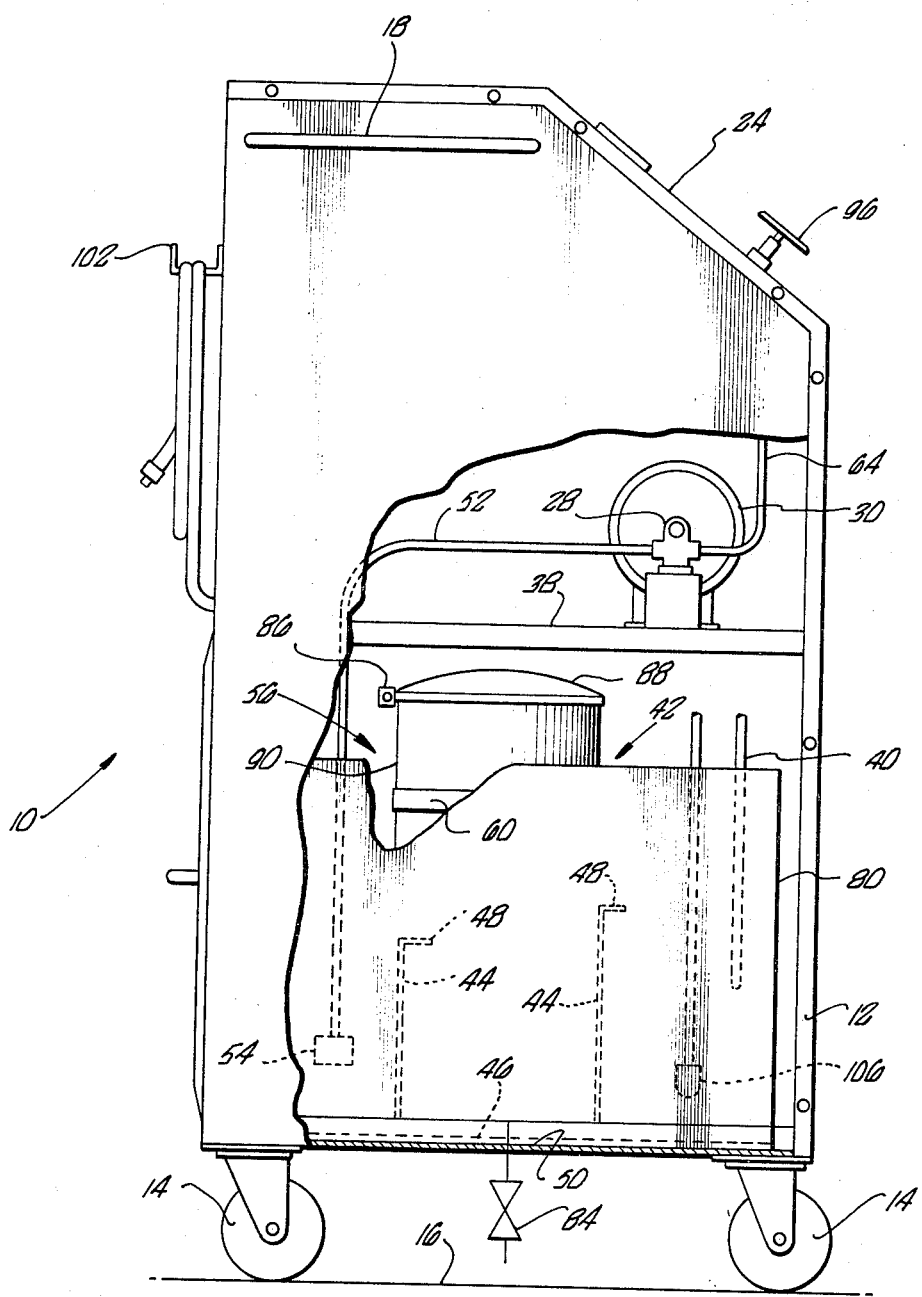
FIG. 2 is a side elevational view, with parts broken away, of the apparatus shown in FIG. 1.

Initially referring to FIG. 1, a flushing apparatus 10 is shown having a conventional frame 12 mounted on preferably swivel casters 14 which are disposed on a supporting surface 16. A pair of handles 18 are secured to the frame to facilitate the ease with which the apparatus is moved about the supporting surface. The apparatus includes a front panel 20 secured to the frame by a plurality of conventional fastening screws 22 and an instrument panel 24 which is preferably inclined to the vertical to make instruments mounted thereon better visible and more accessible.

As best seen in FIG. 3 the operative element of the apparatus include first and second pumps 26 and 28 which are coupled to respective shaft ends of an electric motor 30 by a pair of conventional couplings 32. The first pump 26 has its suction side connected to one end of a suction hose 34, which, at its other end, mounts an end fitting 36 adapted to be connected with a drainage hole (not shown) of an oil collecting pan (not shown) of an internal combustion engine (not shown) which is to be flushed. The pumps and the motor are mounted on a pair of traverse bars 38 secured to the frame 12.

The high pressure side of the first pump 26 is connected with a tubular conduit 40 which extends downwardly into a separation tank 42 to connect the suction hose 34 and the first pump with the separation tank. The separation tank is of a size sufficient to hold a quantity, say eight to ten gallons, of flushing fluid. Preferably, it includes one or more baffle plates 44 which extend upwardly from a bottom 46 of the tank. At their upper end they include a short leg 48 extending away from the plate substantially perpendicular thereto. The separation tank is supported by a floor plate 50 mounted on the frame 12 of the apparatus. A second tubular conduit 52 has one end provided with a screen filter 54 disposed in a separation tank and another end connected with a suction side of the second pump 28.

A filter 56 is secured to upright members 58 of the frame 12 by means of mounting brackets 60 and has an intake 62 connected to a tubular conduit 64 to fluidly connect it with a pressure side of the second pump. An outlet 66 of the filter is connected with another tubular conduit 68 which terminates in a preferably flexible pressure hose 70 having an end provided with a fitting 72 adapted to be connected with a fitting (not shown) of a downstream side of lubrication system (not shown) of the internal combustion engine to be flushed. The lubrication system of the engine is thereby in flow communication with the second pump 28 through the conduit 68, the filter 56, and the conduit 64.

An electric conductor 74 having a conventional plug 76 is connected with the electric motor 30 and a switch 78 mounted on the instrument panel 24 and plugged into an outlet (not shown) to supply the apparatus with the required electric energy. The separation tank 42 is filled with flushing fluid to a level sufficient to submerge both baffle plates 44 and the switch 78 is turned to energize the electric motor. The second pump 28 now circulates flushing fluid from the separation tank to the filter 56 and through the pressure hose 70 into the lubrication system of the engine. Fluid pumped into the lubrication system collects in the oil pan of the engine and is removed through the suction hose 34 back into the separation tank by a pressure differential existing between the oil pan and the suction side of the first pump 26.

Flushing fluid entering the separation tank from the tubular conduit 40 contains foreign particles such as metal shavings, dust, scorched oil-solids, and decomposed substances. The fluid enters the separation tank intermediate a wall 80 of the tank and a baffle plate 44 at a relatively high speed. In the separation tank the speed of the fluid is very low and it stays in the tank for long periods of time. To move to a space intermediate the two baffle plates the fluid must rise above the leg 44 of the first baffle plate. During the rise the heavier foreign particles settle at the bottom 46 of the tank as sludge. A similar process takes place intermediate the two baffle plates where additional foreign particles settle to the bottom 46 of the tank. Only after the fluid traveled to the space between the second baffle plate and another wall 82 of the tank can it be picked up by filter 54 and recirculated to the engine.

A substantial portion of the contaminating foreign particles suspended in the flushing fluid returned from the engine are separated in the tank and settle at its bottom. To enable the removal of the sludge at periodic intervals, a drainage valve 84 is disposed in the bottom 46 of the separation tank.

Remaining contaminating particles are removed from the flushing fluid in filter 56 which includes a plurality of filter elements (not shown) through which the oil is forced under pressure supplied by the second pump 28. Practically all contaminating particles are removed in the filter. Fluid leaving the filter at the outlet 66 is substantially pure and clean and can be recirculated into the lubrication system of the engine to further clean it and to remove foreign particles therefrom. When the filter elements of the filter 56 become clogged, which results in a pressure drop across the filter, and is sensed and signalled as hereinafter described, a clamp 86 securing a lid 88 to a body 90 of the filter is loosened to permit the filter elements to be slidably removed from the body. The elements are then either cleaned or are discarded and replaced by new elements.

Referring to FIGS. 1 and 3, a first pressure gauge 92 is mounted on the instrument panel 24 and is connected with the tubular conduit 64 intermediate the pressure and is connected with the tubular conduit 64 intermediate the pressure side of pump 28 and the intake 62 of the filter 54. A second pressure gauge 94 is likewise mounted on the instrument panel but is connected with the tubular conduit 68 to sense and indicated the pressure at the outlet 66 of the filter. A pressure differential between the first and second pressure gauges is indicative of the contamination of the filter elements in the filter 56. If the differential becomes too large, that is if the second pressure gauge indicates a relatively low absolute pressure at the filter outlet 66, the filter elements need cleaning or replacing. The adequacy of the fluid pressure at the fitting 72 connected with the lubrication system of the engine can thereby be controlled and excessive contamination of the filter elements is communicated to the operator.

The second pump 28 is preferably sized to supply pressure well above the desired fluid pressure at the outlet 66. A conventional regulator or control valve 92 is disposed intermediate the first pressure gauge 92 and the intake 62 of the filter 56 to throttle the pressure to the desired level. Thus, when the filter elements in the filter are clean the regulator is adjusted to reduce the pressure on its downstream side relative to the pressure on its upstream side. As the pressure drop across the filter 56 increases, due to contamination and clogging of the filter elements, the regulator is adjusted to increase the pressure on its downstream side the intake 62 and consequently the outlet 66 of the filter 56. This permits longer servicefree operation of the filter elements without having to replace or clean them while maintaining the pressure supplied to the lubrication system at the desired level. The pressure at the filter intake is increased until it reaches the maximum outlet pressure supplied by the pump 28. Only then and after the pressure at the outlet 66 of the filter 56 has dropped below a minimum value, as indicated by the second pressure gauge 94, must the filter elements be cleaned or replaced.

Turning to the operation of the flushing apparatus 10, the separation tank 42 is first filled with flushing to a level well above the legs 48 of the baffle plates 44. It is filled in any convenient manner such as by removing a rear screen 98 secured to the frame and protecting the interior of the apparatus from becoming damaged, or by providing a suitable intake (not shown) which permits the filling of the separation tank from the exterior of the apparatus. Oil is removed from the oil collecting pan of an internal combustion engine to be flushed by opening a drainage hole (not shown) and the fitting 36 on the suction hose 34 is then secured to the drainage hole. The fitting 72 of the pressure hose is connected to an accessible inlet of the lubrication system of the engine. Thereafter, the switch 78 is turned and the electric motor 30 is activated to commence circulation of the flushing fluid through the lubrication system of the engine as described above. After pressure has built up on the downstream side of the filter as indicated by the second pressure gauge 94, the internal combustion engine is started. Circulation of the flushing fluid through the apparatus as well as through the lubrication system of the engine continues for a period of time sufficient to remove substantially all foreign and contaminating particles from the engine. This time varies with the type of engine and its condition, but, as a general rule, will not exceed twenty to thirty minutes.

To indicate the length of time for which the flushing apparatus has operated a timing clock 100, which can be mechanically or electrically operated, is mounted on the instrument panel 24. After the full flushing cycle has taken place the electric motor is deenenrgized by again turning switch 78 and the suction and pressure hoses 34 and 70, respectively, are disconnected from the combustion engine. Hose hangers 102 are preferably provided exteriorly of the apparatus and its panels to enable the storing of the hoses and prevent them from hanging loosely about the apparatus and becoming damaged.

It will be noted that a positive circulation of the flushing fluid is assured at all times. The separation tank 42 is of sufficient size to prevent it from running low on fluid even during the flushing of relatively large engines such as truck engines, for example. At the same time the first pump 26 positively assures the removal of flushing fluid from the engine's oil pan since pressure differentials transport the fluid from the pan to the pump and from the pump into the separation tank 56. Even a rapid rate of circulation of the fluid prevents the build-up of a high level of flushing fluid in the oil pan. Moreover, clean flushing fluid is constantly recirculated to the lubrication system of the engine such that the level of contamination of the conduits and wall surfaces of the engine is constantly reduced until termination of the flushing cycle. The flushing fluid can be reused a practically indefinite number of times because it is constantly cleaned in the separation tank and the filter. A substantial economic loss from having to discard flushing fluid after each flushing of an engine is thereby eliminated.

The flushing apparatus 10 requires a minimal amount of maintenance. Its maintenance is limited to periodic removals of slude from the bottom of the separation tank through drainage valve 84 and to the above-described replacement or cleaning of filter elements in filter 56. The operator periodically checks the fluid pressure at the downstream side of the filter 56 as indicated by gauge 94 and adjusts the regulator 96 accordingly to insure that adequate pressure is at all times supplied to the pressure hose 70.

Since optimal cleaning action of ordinary flushing fluids is obtained while the engine runs at a working temperature in the neighborhood of between about 180° and about 220° F., a temperature gauge 104 is preferably mounted on the instrument panel 24 and indicates the temperature of the flushing fluid in the separation tank. The temperature gauge is connected with a heat sensing unit 106 disposed in the separation tank 42. Since the temperature of the flushing fluid is a function of the temperature of the combustion engine, the engine temperature can thereby be checked to assure a maximum effectiveness of the flushing operation.

If desired, the timing clock 100 can be connected with the switch 78 in series to act as a cut-off switch after a predetermined time of operation of the flushing apparatus 10. If the timing clock automatically deenergizes the flushing apparatus, it is further connected in series with an ignition switch (not shown) of the combustion engine by a pair of leads 108 and 110 to insure that the engine is turned off whenever the flushing apparatus is not in operation. The leads are preferably provided with quick disconnect electrical terminals (not shown) to facilitate the ease with which they are secured to terminals (not shown) of the ignition switch. If, on the other hand, the electric system of the flushing apparatus 10 is not provided with leads to connect it to the ignition switch of the engine, the timing clock is not adapted to open the electric circuit of the motor to prevent unintentional deenergization of the apparatus when the engine is still running. Such deenergization can cause substantial damage to the engine since it might then run without any lubrication.

In another embodiment of this invention only one pump, namely the first pump 26, is utilized. The separation tank 42 is then constructed as a pressure tank and the first pump 26 pressurizes the first tubular conduit 40, the separation tank 42, the filter 56 and the pressure hose 70. The operation of the flushing apparatus remains the same as that of the preferred embodiment. The control gauges as well as their connections with the fluid circuits remain the same. Particularly, the effectiveness of the suction hose 34 and the positive removal of flushing fluid from the oil pan of the combustion engine are obtained in the same manner as in the preferred embodiment of this invention.

I claim:
1. Apparatus for flushing lubrication systems of internal combustion engines, the apparatus comprising:
   (a) suction means including an intake adapted to be connected with a fluid collecting pan of the engine for removing fluid disposed in the pan;
   (b) a separation tank connected to the suction means for receiving fluid from the suction means, and for separating foreign particles suspended in the fluid therefrom;
   (c) pump means having a suction side connected to the tank;
   (d) filter means connected to the pressure side of the pump means for removing fine particles suspended in the fluid;
   (e) an outlet receiving filtered fluid from the filter means and adapted to be connected with the lubrication system;
   (f) said pump means including an electrical drive motor having a switching means for energizing and deenergizing the motor;
   (g) and means for electrically connecting the switching means with electrical control means of the engine for deenergizing the engine whenever the motor is deenergized.

2. Apparatus according to claim 1 wherein the separation tank is capable of storing a quantity of fluid and includes a baffle plate.

3. Apparatus according to claim 2 including a first conduit connecting the suction means with the separation tank and a second conduit connecting the separation tank with the intake side of the pump means and wherein the baffle plate is disposed intermediate the first and the second conduit.

4. Apparatus according to claim 3 including means disposed intermediate the pressure side of the pump means and the filter means for regulating the pressure with which the fluid is introduced into the filter means.

5. Apparatus according to claim 4 wherein the suction means and the pump means each include a pump and including drive means connected with the pumps for actuating the pumps.

6. Apparatus according to claim 5 wherein the intake and the outlet each include flexible tubular conduit means having a free end adapted to be connected to a drainage hole in the fluid collecting pan and a pressure fitting of the lubrication system respectively.

7. Apparatus for flushing lubrication systems of internal combustion engines with a flushing fluid, the apparatus comprising:
   (a) a housing;
   (b) a suction pump having an intake adapted to communicate with a fluid collecting pan of the engine and an outlet;
   (c) a separation tank including at least one baffle plate constructed to be submerged in the flushing fluid when the tank is filled with fluid;
   (d) a first conduit connected between the pump outlet and the separation tank;
   (e) a filter having an intake and an outlet;
   (f) a second conduit connecting the intake of the filter with a portion of the separation tank disposed opposite the first conduit from the baffle plate;
   (f$^1$) a second pump in series with the second conduit with the pressure side of the second pump communicating with the intake of the filter;
   (g) drive means for actuating the pumps; and
   (h) control means for regulating fluid pressure adjacent the filter intake.

8. Apparatus according to claim 7 including a flexible hose in communication with the intake side of the suction pump and having a free end adapted to be connected with a drainage hole of the fluid collecting pan of the engine.

9. Apparatus according to claim 8 including a flexible hose communicating with the outlet of the filter and having a free end adapted to be connected to a pressure fitting of the lubrication system of the engine.

10. Apparatus according to claim 9 wherein the drive means include an electric motor coupled to the pump and including switching means for selectively energizing and deenergizing the motor.

11. Apparatus according to claim 10 including means for electrically connecting the switching means with electric control means of the engine for deenergizing the engine whenever the motor is deenergized.

12. Apparatus according to claim 7 wherein means for signalling fluid pressure adjacent the filter outlet.

13. Apparatus according to claim 12 including means for signalling the temperature of flushing fluid disposed in the apparatus.

14. The combination in accordance with claim 10 wherein said switching means includes timing means for energizing the electric motor for preselected periods of time.

15. The combination in accordance with claim 14 wherein said timing means is connected to energize the motor and the engine for a preselected period of time.

References Cited

UNITED STATES PATENTS

| 2,303,261 | 11/1942 | Dunmire | 210—168 X |
| 2,312,604 | 3/1943 | Thompson | 210—168 X |
| 2,425,848 | 8/1947 | Yawter | 210—241 X |
| 2,685,347 | 8/1954 | Busby | 210—241 X |
| 2,782,929 | 2/1957 | Colket | 210—320 X |
| 3,394,812 | 7/1968 | Cohen et al. | 210—241 X |

SAMIH, N. ZAHARNA, Primary Examiner

U.S. Cl. X.R.

210—90, 168, 241, 259